United States Patent
Petrowicz

[19]

[11] Patent Number: 5,845,483
[45] Date of Patent: Dec. 8, 1998

[54] WINDMILL ENGINE STARTING SYSTEM WITH FLUID DRIVEN MOTOR AND PUMP

[75] Inventor: John P. Petrowicz, Rowley, Mass.

[73] Assignee: General Electric Company, Cincinnati, Ohio

[21] Appl. No.: 627,809

[22] Filed: Apr. 10, 1996

[51] Int. Cl.[6] ............................................. F02C 7/262
[52] U.S. Cl. .................... 60/39.142; 60/39.141; 60/39.163
[58] Field of Search ............................ 60/39.142, 39.141, 60/39.163, 39.091; 244/53 A

[56] References Cited

U.S. PATENT DOCUMENTS

| | | | |
|---|---|---|---|
| 2,952,973 | 9/1960 | Hall et al. ............................... | 60/39.18 |
| 3,145,532 | 8/1964 | Moss ...................................... | 60/39.142 |
| 3,171,252 | 3/1965 | Trowbridge et al. ................. | 60/39.142 |
| 4,062,185 | 12/1977 | Snow ....................................... | 60/204 |
| 4,062,186 | 12/1977 | Snow et al. ............................. | 60/39.142 |
| 4,205,945 | 6/1980 | Davis ....................................... | 417/53 |
| 5,107,674 | 4/1992 | Wibbelsman et al. ................. | 60/39.06 |
| 5,349,814 | 9/1994 | Ciokajlo et al. ........................ | 60/266.1 |
| 5,694,765 | 12/1997 | Hield et al. ............................. | 60/39.163 |

OTHER PUBLICATIONS

Traeger, "Aircraft Gas Turbine Engine Technology," 1979, pp: i, ii, 307–324.

*Primary Examiner*—Timothy Thorpe
*Assistant Examiner*—Ted Kim
*Attorney, Agent, or Firm*—Andrew C. Hess; David L. Narciso

[57] ABSTRACT

An engine starting system is provided for an aircraft gas turbine engine having a fan, compressor, combustor, high pressure turbine joined to the compressor by a core shaft, and a low pressure turbine joined to the fan by a fan shaft. A fluid assist pump is operatively joined to the fan shaft, and a fluid assist motor is operatively joined to the core shaft and the assist pump. The assist pump and motor are selectively engaged so that windmilling of the fan during aircraft flight powers the assist pump to in-turn power the assist motor to accelerate the core shaft to a minimum speed for allowing restarting of the engine in flight.

10 Claims, 3 Drawing Sheets

WINDMILL ENGINE STARTING SYSTEM WITH FLUID DRIVEN MOTOR AND PUMP

BACKGROUND OF THE INVENTION

The present invention relates generally to aircraft gas turbine engines, and, more specifically, to in-flight starting thereof.

Turbofan gas turbine engines are commonly used for powering aircraft in flight. A typical turbofan engine includes in serial flow communication a fan, compressor, combustor, high pressure turbine (HPT), and low pressure turbine (LPT), with a core shaft joining the HPT to the compressor, and a fan shaft joining the LPT to the fan. During operation, air is compressed in the compressor and mixed with fuel and ignited in the combustor for generating combustion gases which flow downstream through the turbines which extract energy therefrom for rotating the core and fan shafts to power the engine and propel the aircraft in flight.

In order to initially start the engine, the core shaft must be accelerated to a suitable minimum, starting speed for suitably compressing the air for allowing the engine to be started. Various types of engine starters are available for rotating the core shaft to its starting speed. Larger engines correspondingly require suitably powerful starters for providing the substantial torque required for accelerating the core shaft to the starting speed.

In a typical wide body passenger-carrying commercial aircraft, the relatively large turbofan engines thereof typically use an air powered starter for driving the core shaft to the starting speed. A typical turbofan engine includes an accessories gearbox operatively joined to the core shaft using a power takeoff (PTO) shaft for obtaining power to drive various engine accessories. The engine starter is operatively joined to the gearbox and is selectively engageable therewith so that the starter may be used for initially driving the core shaft through the PTO shaft to start the engine. Once the engine has started, the starter is disengaged.

The starter is powered by compressed air which is typically supplied by a mobile ground cart placed in position next to the aircraft. The ground cart includes its own power supply for providing electricity to the aircraft and compressed air for use in powering the starter for example. After all the engines of the aircraft have been started, the ground cart is no longer required and is wheeled away.

Since the ground cart is not available for starting the engines when the aircraft is airborne, auxiliary sources of compressed air for powering the starters are required in the aircraft. For example, the aircraft includes an auxiliary power unit (APU) which is typically a small gas turbine engine which is normally not operating during aircraft flight. As required, the APU is started for powering an electrical generator to provide auxiliary electrical power to the aircraft; for powering an hydraulic pump to pressurize hydraulic fluid for aircraft systems; and for powering an air compressor for providing compressed air in the aircraft, which may also be used for operating the engine starter. Alternatively, the aircraft typically includes cross air bleeding systems between the several engines so that compressor air from a running engine may be used for powering the starter of a non-running engine as required. However, in the event of an all-engines-out condition occurring in flight, cross bleeding is not available for starting the engines, and operation of the APU requires a minimum lag time before suitable compressed air is available for powering the engine starters.

Another conventional manner for providing in-flight restarting of the engines in an all-engines-out condition is for the aircraft to assume a preferred glide slope to establish sufficient aerodynamic ram air in the engines to increase the rotational speed of the core shaft by windmilling the compressor blades thereof. Upon reaching the minimum starting speed, the combustor may be re-lighted for restarting the engine.

The glide slope required for accelerating the aircraft to a suitable air speed for generating sufficient ram air for restarting the engine necessarily decreases the available amount of aircraft glide travel. This is contrary to the desire to increase unpowered glide travel, and corresponding time for finding a suitable landing field in the event that the engines do not re-light.

Furthermore, an engine-out condition may occur in aircraft takeoff or landing approach due to bird ingestion, for example. Re-starting of the non-running engine must also be provided for in these events.

In addition to using the APU in the aircraft for restarting the engines, other starting assist systems are conventionally known. For example, separate starters with pyrotechnic charges are known. And, completely redundant self-contained combustion engine starters may also be used. In all these examples, some form of external power must be provided for restarting the engines, which increases the complexity and cost of the overall aircraft.

SUMMARY OF THE INVENTION

An engine starting system is provided for an aircraft gas turbine engine having a fan, compressor, combustor, high pressure turbine joined to the compressor by a core shaft, and a low pressure turbine joined to the fan by a fan shaft. A fluid assist pump is operatively joined to the fan shaft, and a fluid assist motor is operatively joined to the core shaft and the assist pump. The assist pump and motor are selectively engaged so that windmilling of the fan during aircraft flight powers the assist pump to in-turn power the assist motor to accelerate the core shaft to a minimum speed for allowing restarting of the engine in flight.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
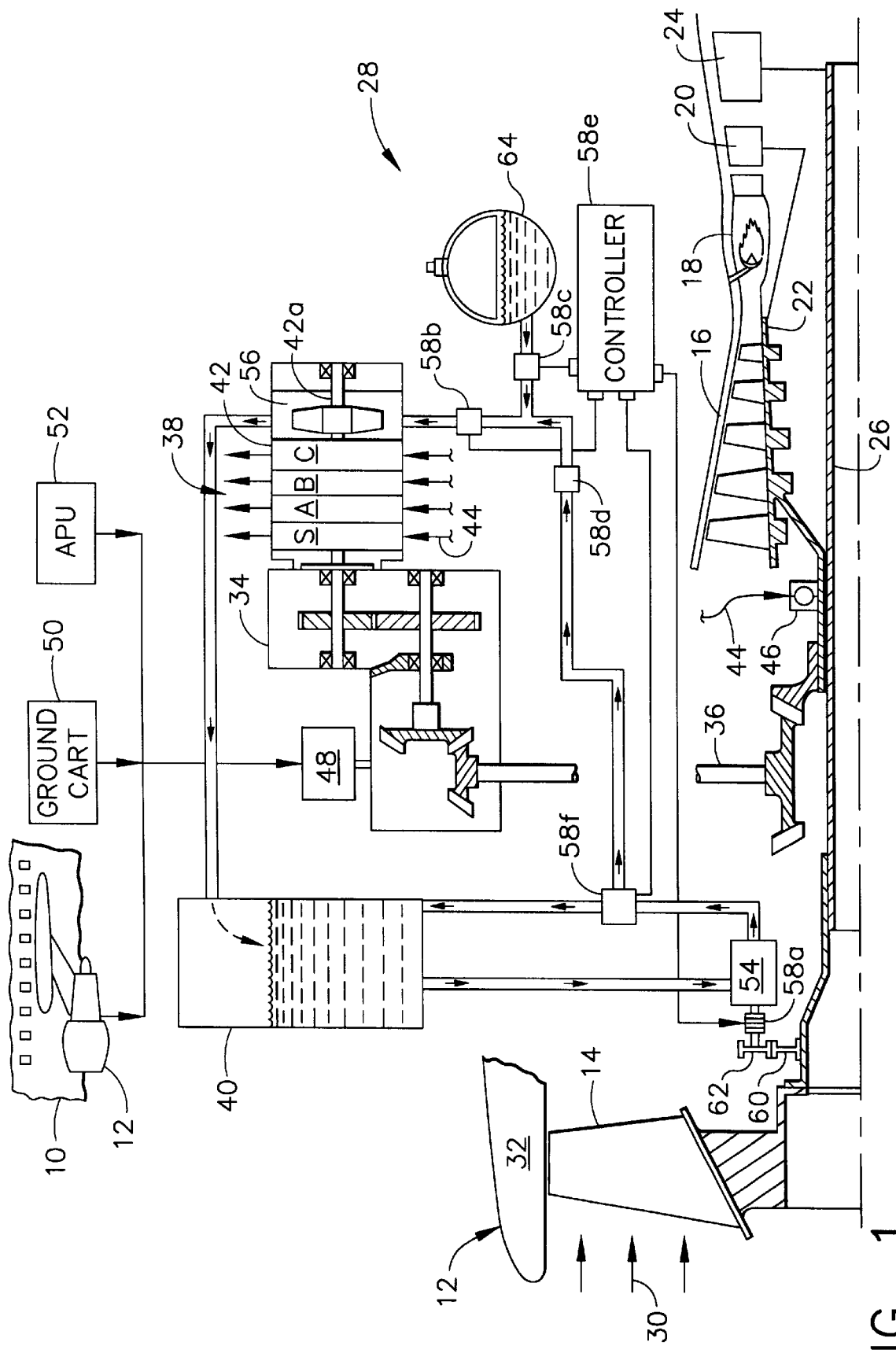
FIG. 1 is a schematic representation of an aircraft having a plurality of turbofan gas turbine engines including an engine starting system in accordance with a preferred embodiment of the present invention for providing in-flight relighting of an engine.

Illustrated schematically in FIG. 1 is a portion of an aircraft 10 having a plurality of turbofan gas turbine engines 12 suitably mounted to a wing thereof, or a tail as desired. Relevant portions of one of the engines 12 is illustrated in more particularity and includes in serial flow communication about a longitudinal or axial centerline axis a fan 14, a compressor 16, a combustor 18, a high pressure turbine (HPT) 20 joined to the compressor 16 by a first or core shaft 22, and a low pressure turbine (LPT) 24 joined to the fan 14 by a second or fan shaft 26. Each of the engines 12 includes an identical engine starting system 28 for use in accelerating the core shaft 22 to a minimum rotating speed for starting the engines either on the ground or in-flight.

During operation, ambient air 30 enters the engine 12 through a fan nacelle 32 and flows over the rotor blades of the fan 14. A portion of the air 30 is channeled through the compressor 16 wherein it is compressed and channeled to the combustor 18 in which it is mixed with fuel and ignited for generating hot combustion gases which flow downstream through the turbines 20, 24 which extract energy therefrom for powering both the core shaft 22 and the fan shaft 26. The outer portion of the air 30 flowing through the fan 14 bypasses the core engine and produces thrust for powering the aircraft in flight.

The engine 12 further includes an accessories gearbox (AGB) 34 which is suitably operatively joined to the core shaft 22 by a power takeoff (PTO) shaft 36 by suitable gears. The engine 12 also includes an engine lubrication system 38 having an oil tank 40 containing a lubricating oil therein, a lube pump 42, and suitable conduits 44 for circulating the lube oil to bearings 46 in the engine 12. An exemplary one of the bearings 46 is illustrated, with the various bearings being used for suitably rotatably mounting the core and fan shafts 22, 26. The lube system 38 includes various other components such as filters and coolers which are not shown for clarity of presentation. The engine 12 itself including the lube system 38 is conventional in configuration and operation except as modified in accordance with the present invention for additionally providing in-flight windmilling restart capability thereof as described in more detail hereinbelow.

The lube pump 42 is operatively joined to the gearbox 34 for being powered by the core shaft 22. The lube pump 42 includes a common shaft 42a driven by the gearbox 34, with the shaft 42a having a plurality of pumping impellers designated S, A, B, and C for circulating the lube oil to and from the bearings 46 in a conventional manner. Impeller S defines a supply pump which pumps the lube oil from the oil tank 40 through a filter and oil cooler which is then channeled through suitable ones of the conduits 44 to the several bearings 46 for providing lubrication thereof. Spent oil from the bearings 46 is collected in various sumps corresponding with the pumping impellers A, B, and C which define respective pumps for returning the spent, or scavenge, oil back to the oil tank 40 through corresponding ones of the conduits 44.

Each engine 12 further includes an engine primary starter 48 which is operatively joined to the gearbox 34 for selectively accelerating the core shaft 22 to the minimum speed required for allowing starting of the engine 12 on the ground. The primary starter 48 is conventional, and in the exemplary embodiment illustrated in a pneumatic or air operated motor which utilizes compressed air for spinning an air turbine therein for in-turn rotating the PTO shaft 36 for accelerating the core shaft 22 in starting the engine in a conventional manner. The primary starter 48 requires suitable power for operation which is typically provided by a conventional mobile ground cart 50 having a self contained power supply for producing compressed air for powering the primary starter 48, as well as providing electrical power for the aircraft 10 when it is on the ground.

A conventional auxiliary power unit (APU) 52 is typically carried in the aircraft 10, and is typically in the form of a small, independent gas turbine engine which is started when desired for powering an electrical generator to produce electrical power; for powering an hydraulic pump for pressurizing hydraulic fluid for use in aircraft hydraulic systems; and for powering an air compressor for compressing air, which is used in part for powering the primary starter 48 when desired.

Compressed air may also be provided to the primary starter 48 of one engine 12 through a conventional cross-bleeding system from other engines 12 of the aircraft 10. In this way, a non-running engine 12 may be restarted in flight by bleeding air from a running engine 12.

As indicated above, the primary starter 48 and its several power sources are conventional in configuration and operation, and may be used for starting any of the engines 12 either on the ground or in flight. However, in an all-engines-out condition, cross bleeding from a running engine is not available for starting the engines, and the APU 52 would therefore be typically started for providing the compressed air required for powering the primary starter 48.

In accordance with one embodiment of the present invention, the engine starting system 28 includes auxiliary engine starting capability for in-flight restarting of any of the engines 12 using windmilling of the respective fans 14 thereof due to the ram-effect of the inlet air 30 for rotating the core shaft 22. Since the aircraft 10 is traveling at a considerable speed in flight, the inlet air 30 is forced into each engine 12 by ram pressure which is effective for rotating the fan 14 and the compressor 16, and in turn the respective shafts joined thereto. Flow of the ram air through the compressor blades is not typically sufficient for accelerating the core shaft 22 to a suitable restarting speed to allow the combustor 18 to be relighted unless the aircraft 10 is traveling at a suitably high air speed, which may be obtained by placing the aircraft 10 into a suitably steep glide path for increasing the ram air pressure. Increasing the glide slope correspondingly decreases the available glide path as the aircraft decreases in altitude. It is desirable, therefore, to provide effective windmill restarting of a non-running engine 12 using the least glide slope possible for ensuring maximum glide path.

Accordingly, in accordance with one embodiment of the present invention as illustrated in FIG. 1, the engine starting system 28 further includes a fluid assist pump 54 which is operatively joined to the fan shaft 26. The assist pump 54 may take any conventional form for pressurizing a suitable fluid, such as oil, for use in starting assist. An auxiliary starter in the form of a fluid assist motor 56 is operatively joined to the core shaft 22 through the gearbox 34 and PTO shaft 36, and is also joined to the assist pump 54 from which it receives pressurized fluid to power the motor 56.

Means designated by the prefix 58 are provided for selectively engaging the assist pump 54 and motor 56 so that windmilling of the fan 14 by the ram air 30 during aircraft flight powers the pump 54 to in-turn power the motor 56 to accelerate the core shaft 22 of a non-running, flame-out one of the engines 12 to a minimum rotary speed for allowing restarting of the engine 12 in flight. Operating the non-running engine 12 at a suitable minimum core shaft speed provides a sufficient amount of compressed air in the combustor 18 which may be conventionally mixed with fuel and ignited for restarting the engine in flight. In this way, ram-air rotation of the fan 14 may be used for increasing rotation of the compressor 16 to improve in-flight restarting of the engine without requiring an otherwise steeper glide slope. The assist motor 56 is powered independently of the primary starter 48 which receives its power through the compressed air from the ground cart 50, APU 52, or cross bleeding from another engine 12.

In the exemplary embodiment illustrated in FIG. 1, a first, bull gear 60 is fixedly joined coaxially to the fan shaft 26 for rotation therewith. A second, pinion gear 62 is suitably mounted for rotation about its centerline axis for operatively engaging the first gear 60 for rotation therewith in a speed increasing ratio. The engaging means include a conventional clutch 58a operatively joined to the second gear 62 and the assist pump 54 through corresponding shafts. The clutch 58a is operable in selective engagement between the second gear 62 and the pump 54 for pressurizing the fluid channeled to the assist motor 56 for powering the motor 56 when desired. When the clutch 58a is disengaged, power from the fan shaft 26 is not transmitted to the assist pump 54 for minimizing wasted energy when operation of the pump 54 is not required.

As long as suitable ram air is available for driving the fan 14 to power the assist pump 54 in flight, the pump 54 itself may pressurize the fluid for driving the motor 56. However, during takeoff or landing for example, it is desirable to include a conventional fluid accumulator 64 operatively joined to the assist motor 56 and the assist pump 54 for storing fluid under pressure from the assist pump 54. The accumulator 64 typically includes a suitably air pressurized bladder so that the pumping fluid may be pumped under pressure into the accumulator 64 and stored therein as desired. The assist pump 54 may therefore be used to pressurize the fluid in the accumulator 64.

Accordingly, the engaging means preferably further include a start valve 58b disposed in fluid communication between the assist pump 54 and the assist motor 56. A reserve valve 58c is disposed in fluid communication between the accumulator 64 and the start valve 58b. A one-way check valve 58d is disposed in fluid communication between the assist pump 54 and the start and reserve valve 58b,c. And a suitable electrical controller 58e is operatively joined to the clutch 58a, start valve 58b, and reserve valve 58c for selectively engaging the clutch 58a to rotate the pump 54 to pump fluid under pressure to the start and reserve valves 58b,c. The controller 58e is also effective for selectively opening the start valve 58b to power the assist motor 56 when required; and for selectively opening the reserve valve 58c to power the assist motor 56 for recharging the accumulator 64. The controller 58e may be the main engine controller in the exemplary form of a programmable digital processor having suitable circuits and software therein for controlling operation of the engine starting system 28, including operation of the valves and clutch for channeling the pressurized fluid to the auxiliary starter 56.

The respective valves are disposed in corresponding branches of the conduits joining the assist pump 54 to the assist motor 56 and the accumulator 64. The start and reserve valves 58b,c are normally closed, with the start valve 58b being opened when desired for directly channeling the pressurized fluid to the assist motor 56 for accelerating the core shaft 22. In the event that insufficient ram air is available for powering the assist pump 54, the reserve valve 58c may be opened along with the start valve 58b for discharging the pressurized fluid stored in the accumulator 64 for flow through the assist motor 56 for accelerating the core shaft 22. The accumulator 64 may be recharged with pressurized fluid at a suitable time, which may be accomplished by operating the assist pump 54, with the start valve 58b being closed and the reserve valve 58c being open. The check valve 58c prevents backflow of the pressurized fluid when the accumulator 64 is being discharged.

As shown in FIG. 1, the assist motor 56 is preferably operatively joined to the gearbox 34 independently of the primary starter 48 for separately driving the core shaft 22 through the common PTO shaft 36 for starting the engine 12. In this way, either the primary starter 48 or the auxiliary starter 56 may be separately used when desired for accelerating the core shaft 22 in starting the engine.

In the preferred embodiment illustrated in FIG. 1, the assist motor 56 is integral with and is part of the lube pump 42 in a common component. Since the lube pump 42 and the lube system 38 are already available in the engine 12, they may be suitably modified in accordance with the present invention for effecting auxiliary air-starting of the engine 12. The assist motor 56 in a simple form comprises a motor impeller fixedly joined to the common lube pump shaft 42a in a suitable housing configured specifically therefor. The motor impeller 56 is joined through suitable conduits in fluid communication between the start valve 58b and the oil tank 40. The assist pump 54 is preferably joined in fluid communication between the oil tank 40 and the check valve 58d for pumping a portion of the lube oil in the tank 40 to power the motor impeller 56 in a closed loop.

A suitable bypass valve 58f is disposed in fluid communication in the discharge conduit of the assist pump 54 from between the assist pump 54 and the check valve 58d to the oil tank 40 to selectively bypass flow from the assist pump 54 to the oil tank 40 instead of to the assist motor 56 through the check valve 58d. The bypass valve 58f is operatively joined to the controller 58e for controlling its operation for directing the pressurized fluid from the assist pump 54 to the check valve 58d, or instead in a return path to the oil tank 40. When air starting is not required, the lube oil is either recirculated through the assist pump 54 and the oil tank 40 through the corresponding conduits and bypass valve 58f; or the assist pump 54 is disconnected from the second gear 62 by disengaging the clutch 58a.

A significant advantage of the present engine starting system is the use of the fan 14 in addition to the compressor 16 in converting ram air into rotary speed of the core shaft 22 for reaching a suitable speed to relight the combustor 18. The system does not, therefore, rely upon any outside source of power as required by the primary starter 48. The system is self contained and utilizes either ram air for power, or the stored pressurized fluid in the accumulator 64. Although the assist pump 54 is mechanically joined to the fan shaft 26, it may be disengaged by operation of the clutch 58a during normal operation of the engine 12. However, the core shaft 22 is selectively joined to the fan shaft 26 when desired using a non-mechanical fluid coupling in the form of the pressurized fluid channeled between the assist pump 54 and the assist motor 56. This improves reliability of the system to ensure substantially independent operation of the core shaft 22 and the fan shaft 26 for ensuring normal operation of the engine 12. This system also provides effective in-flight engine restarting during takeoff, cruise, and landing.

In the embodiment illustrated in FIG. 1, the auxiliary starter is incorporated in conjunction with the existing engine lubrication system 38 and utilizes engine lubrication oil as the power transfer medium. Existing engine hardware may therefore be used with corresponding modifications, which also allows the system to be retrofitted to turbofan engines without significant redesign. The system also avoids the need for providing a completely separate restart system having undesirable pyrotechnic charges or toxic or combustible fluids or gases.

Figure 2:
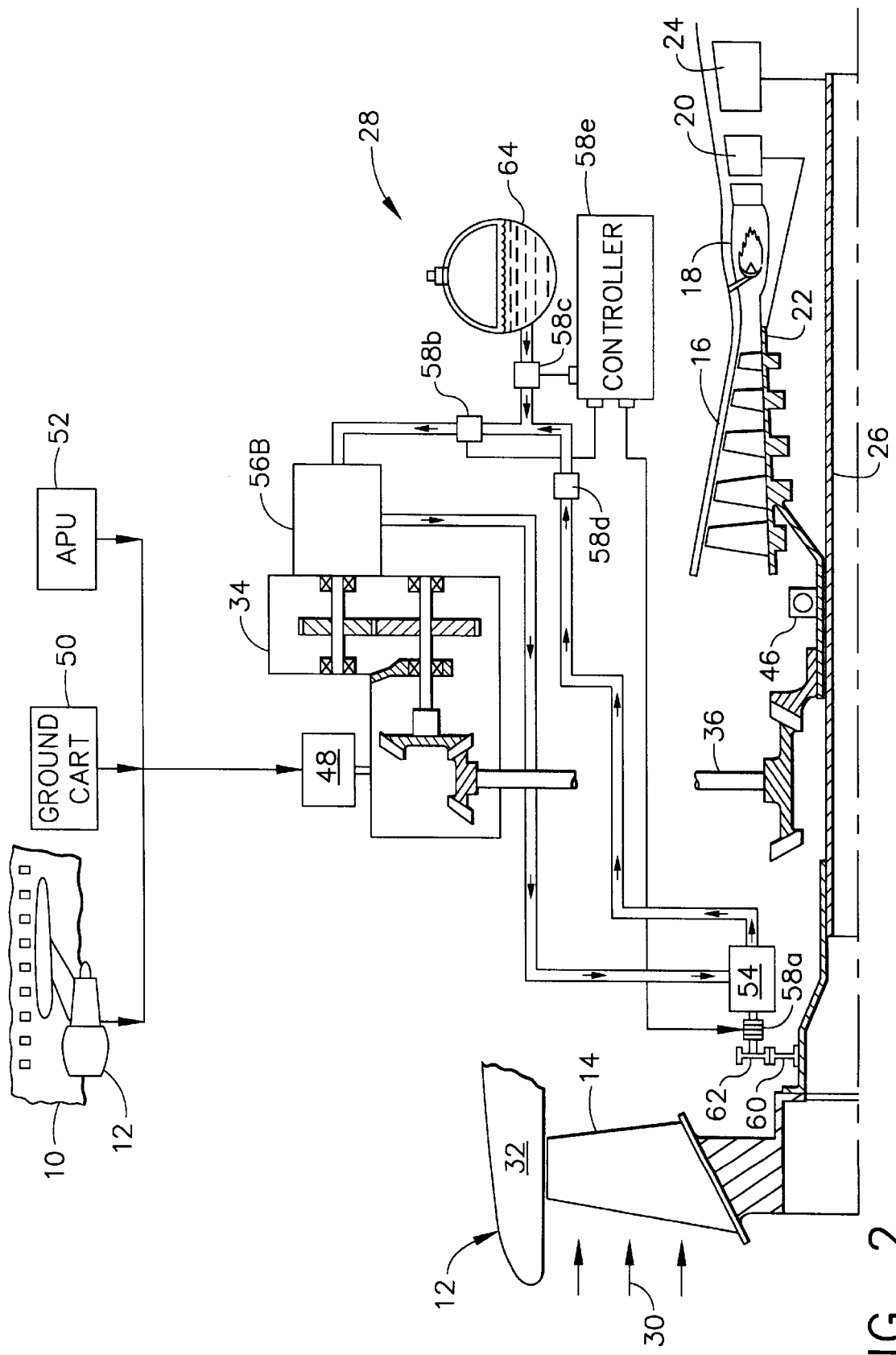
FIG. 2 is a schematic representation of an aircraft including a plurality of turbofan gas turbine engines including an engine starting system in accordance with a second embodiment of the present invention.

FIG. 2 illustrates another embodiment of the engine starting system 28 which is substantially identical to the FIG. 1 embodiment except that the lube pump 42 (not shown) is unaltered, with the assist motor, designated 56B, being instead directly mounted to the accessory gearbox 34 for independently driving the PTO shaft 36 when desired for restarting the engine 12. The assist motor 56B may take any conventional form including a reciprocating piston motor directly mounted to the gearbox 34. The assist pump 54 is similarly disposed in fluid communication with the assist motor 56B in a closed loop independent of the lubrication system 38 (not shown), and therefore does not use the oil or the oil tank thereof for operation. The assist pump 54 is therefore directly joined to the check valve 58*d* to supply pressurized fluid, such as oil, to the assist motor 56B. A return conduit is provided from the assist motor 56B directly back to the assist pump 54. Various conduits of the system may be sized for providing a suitable reservoir for the pumping fluid. Since the oil tank of the lubrication system is not used in this embodiment, the bypass valve 58*f* and conduits between the assist pump 54 and the oil tank 40 are not required or used. This embodiment enjoys most of the advantages described above, except that it is configured in its own closed loop system with its own circulating fluid independently of the engine lubricating system.

Figure 3:
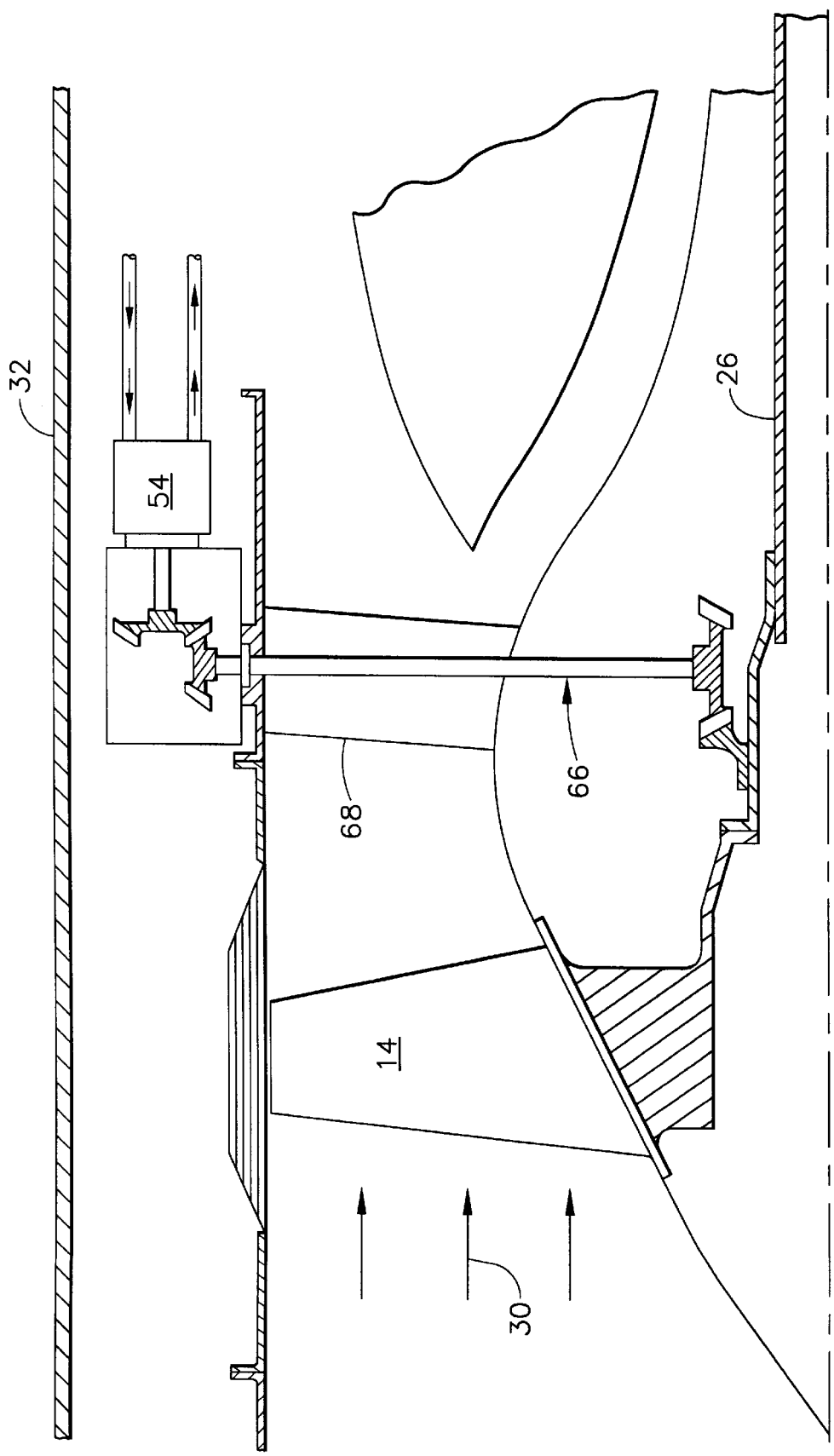
FIG. 3 is a schematic representation of a portion of the fan nacelle of the engine illustrated in FIG. 2 illustrating a portion of an engine starting system in accordance with another embodiment of the present invention having an assist pump located within the fan nacelle.

In the embodiments illustrated in FIGS. 1 and 2, the assist pump 54 is located within the core engine radially below and axially aft of the fan 14. In an alternate embodiment of the invention illustrated in part in FIG. 3, the assist pump 54 is disposed inside the nacelle 32 radially outwardly of the fan 14. Power from the fan shaft 26 is carried to the assist pump 54 by a suitable gear train 66 which may be similar in configuration and operation to the gear train including the PTO shaft 36. A suitable shaft of the gear train 66 extends radially outwardly from the fan shaft 26 through one of the several frame struts 68 supporting the nacelle 32. In this arrangement, the assist pump 54 is moved from the fan sump cavity and into the nacelle 32 for providing improved maintenance access and serviceability. The provided power takeoff using the gear train 66 may be used for providing additional drive pads for mounting aircraft emergency hydraulic pumps and electrical generators for eliminating the need for a conventional aircraft supplied "pop-out" wind turbine used in some conventional aircraft.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention. For example, the invention may also be used in a turboprop gas turbine engine wherein the propeller is used for windmill powering the assist pump suitably joined to the propeller gearbox. Although a turboprop engine includes a propeller gearbox and a turbofan engine does not, the engines are nevertheless similar in construction in that a core engine drives either a propeller through a gearbox or a fan without a gearbox. They each include two independent rotor shafts, with the fan or propeller shaft being used to drive the core shaft for windmill restarting of the engine in accordance with the present invention. In this regard, therefore, the term "fan" as used in the claims also includes the term "propeller" in the generic sense that both types of rotor blades produce thrust by moving air. Additional details of the engines determine whether a specific species is a turbofan or turboprop engine.

Accordingly, what is desired to be secured by Letters Patent of the United States is the invention as defined and differentiated in the following claims:

I claim:

1. In an aircraft gas turbine engine having a fan, compressor, combustor, high pressure turbine joined to the compressor by a core shaft, and a low pressure turbine joined to the fan by a fan shaft, an engine starting system comprising:

a fluid assist pump operatively joined to said fan shaft;

a fluid assist motor operatively joined to said core shaft and said assist pump;

means for selectively engaging said assist pump and motor so that windmilling of said fan during aircraft flight powers said pump to in-turn power said motor to accelerate said core shaft to a minimum speed for allowing restarting of said engine in flight; and a fluid accumulator operatively joined to said assist motor and assist pump for storing fluid under pressure from said assist pump;

wherein said engaging means further include:

a start valve disposed in fluid communication between said assist pump and assist motor;

a reserve valve disposed in fluid communication between said accumulator and said start valve;

a check valve disposed in fluid communication between said assist pump and said start and reserve valves; and a controller operatively joined to said start valve and reserve valve for selectively opening said start valve to power said assist motor and for selectively opening said reserve valve to power said assist motor.

2. A system according to claim 1 further comprising:

an accessories gearbox operatively joined to said core shaft by a power takeoff shaft;

an engine primary starter operatively joined to said gearbox for selectively accelerating said core shaft for allowing starting of said engine; and means for powering said primary starter independently of said assist motor.

3. A system according to claim 2 further comprising:

a first gear fixedly joined to said fan shaft for rotation therewith;

a second gear operatively engaging said first gear; and wherein said engaging means include a clutch operatively joined to said second gear and said assist pump in selective engagement therebetween to power said assist motor, and otherwise in disengagement therebetween.

4. A system according to claim 3 wherein said controller is operatively joined to said clutch and includes means for selectively engaging said clutch to pump fluid under pressure to said start and release valves.

5. A system according to claim 4 wherein said assist motor is operatively joined to said gearbox independently of said primary starter for separately driving said core shaft for starting said engine.

6. A system according to claim 5 further comprising:

an engine lubrication system including an oil tank, a lube pump, and conduits for circulating lube oil to bearings in said engine, with said lube pump being operatively joined to said gearbox for being powered by said core shaft; and wherein said assist motor is integral with said lube pump.

7. A system according to claim 6 wherein:

said lube pump includes a common shaft having pumping impellers for circulating said lube oil to and from said bearings, and said assist motor comprises a motor impeller joined in fluid communication between said start valve and said oil tank; and said assist pump is joined in fluid communication between said oil tank and said check valve for pumping said lube oil to power said motor impeller in a closed loop.

8. A system according to claim 7 further comprising a bypass valve disposed in fluid communication from between said assist pump and check valve to said oil tank to selectively bypass flow from said assist pump to said oil tank instead of to said assist motor.

9. A system according to claim 5 wherein:

said assist motor is a reciprocating piston motor directly mounted to said gearbox; and said assist pump is disposed in fluid communication with said assist motor in a closed loop.

10. A system according to claim 5 wherein said engine includes a nacelle surrounding said fan, and said assist pump is disposed inside said nacelle radially outwardly of said fan.

\* \* \* \* \*